United States Patent [19]

Magninat et al.

[11] Patent Number: 4,898,460

[45] Date of Patent: Feb. 6, 1990

[54] SPECTACLES HAVING A FRAME FORMED BY AN ELONGATED CYLINDRICAL ELEMENT COMPRISING DEFORMABLE BELLOWS

[75] Inventors: Michel Magninat; Eric Charden, both of Paris, France

[73] Assignee: Bronton Limited, France

[21] Appl. No.: 213,017

[22] Filed: Jun. 29, 1988

[30] Foreign Application Priority Data

Jul. 1, 1987 [FR] France ................................ 87 09293

[51] Int. Cl.⁴ ............................ G02C 5/14; G02C 5/22
[52] U.S. Cl. ..................................... 351/114; 351/153; 351/41
[58] Field of Search ..................... 351/51, 52, 114, 118, 351/121, 153, 41; 16/228

[56] References Cited

U.S. PATENT DOCUMENTS 4,687,306 8/1987 Lipson et al. ..................... 351/52 X

FOREIGN PATENT DOCUMENTS 8600012 1/1986 PCT Int'l Appl. ................. 351/114
490050 8/1938 United Kingdom ............... 351/114

Primary Examiner—Rodney B. Bovernick
Attorney, Agent, or Firm—Larson and Taylor

[57] ABSTRACT

Spectacles characterized in that the frame is formed by an initially rectilinear, elongated cylindrical element incorporating, at least at the junction of each branch (4) with the front part of the frame (3), a semi-rigid deformable bellows, the frame being preferably in the form of a plastics straw intended for beverages.

8 Claims, 2 Drawing Sheets

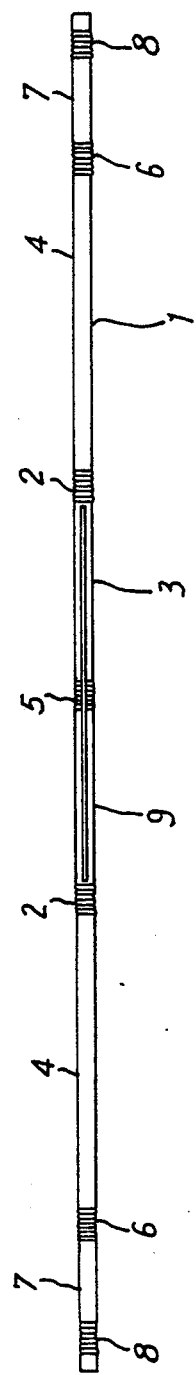
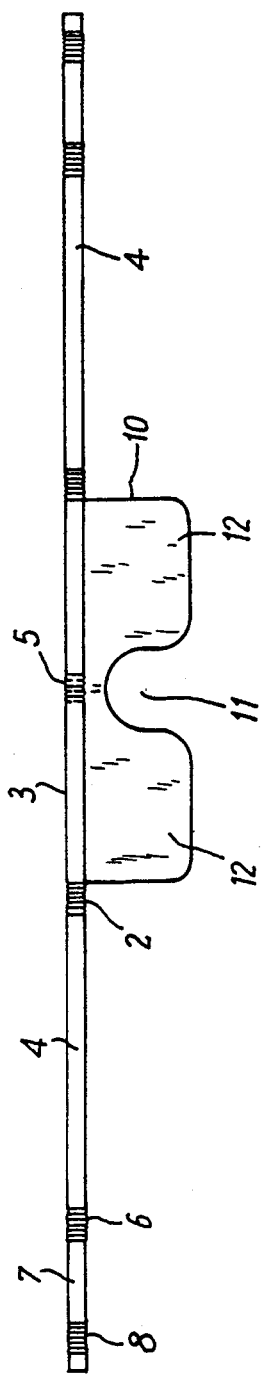

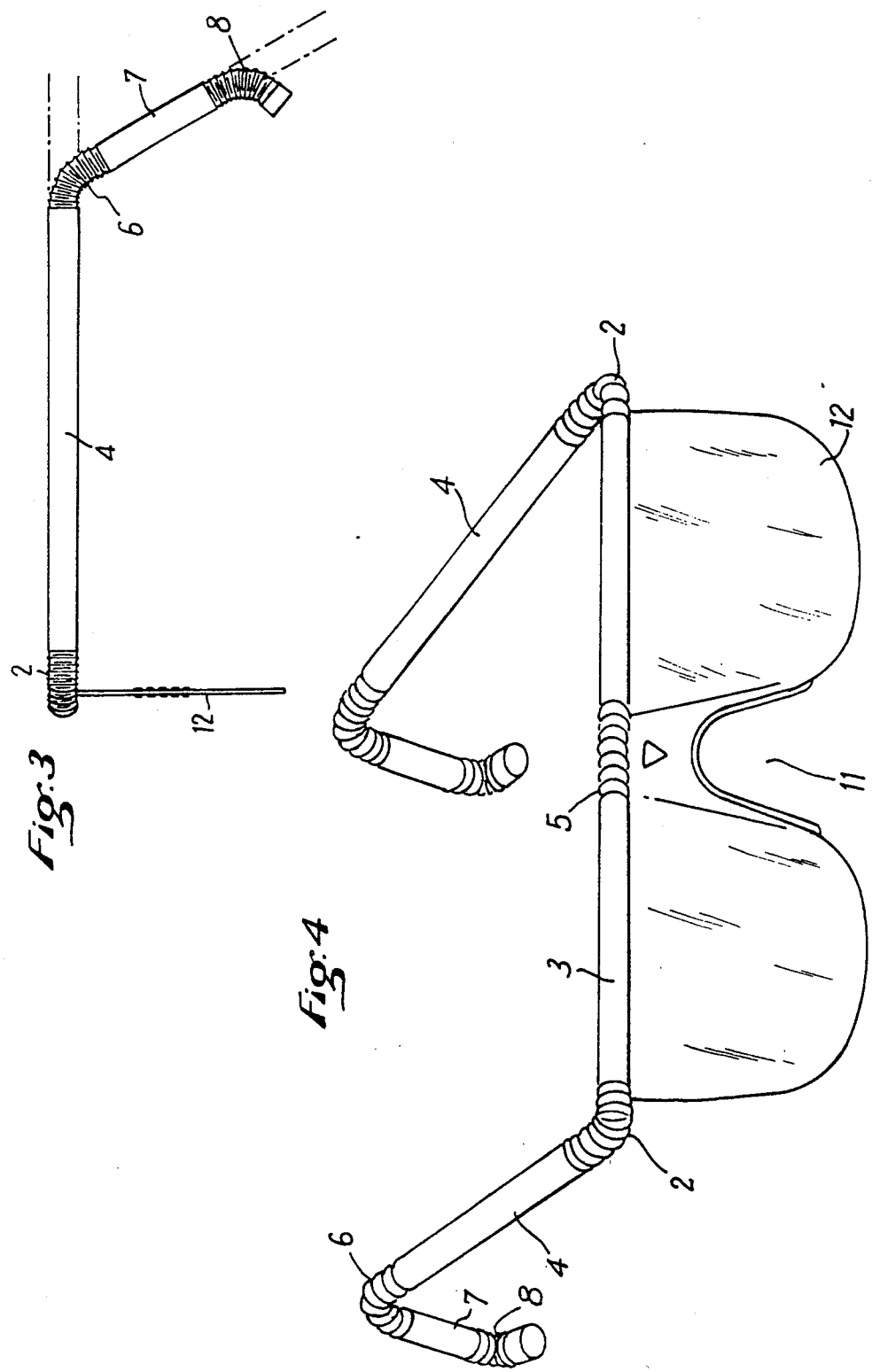

SPECTACLES HAVING A FRAME FORMED BY AN ELONGATED CYLINDRICAL ELEMENT COMPRISING DEFORMABLE BELLOWS

The present invention relates to novel spectacles. The spectacles may have, as the case may be, correcting lenses or simply tinted lenses or, more generally, a simply decorative character.

Very many types of spectacles already exist which comprise a frame and a set of lenses. However, and generally, none of these frames combines simultaneously different contradictory advantages, such as facility of transport and assembly, low cost price, great comfort and an original appearance.

The present invention proposes to provide spectacles which have all these advantages and are in particular simple, very cheap, easy to assemble, easy to transport, light, strong and capable of being particularly closely adapted to the morphology of the persons wearing them.

The invention has for its subject matter spectacles comprising a frame and a set of lenses, characterized in that the frame is formed by an elongated, initially rectilinear, cylindrical element incorporating, at least at the junction of each branch with the front part of the frame, a semi-rigid deformable bellows.

The expression semi-rigid deformable bellows is intended to mean a bellows which may be bent and retains the elbow shape imparted thereto while it is capable of being subsequently deformed again.

Preferably, the cylindrical element is a cylinder of circular section, in particular a tubular cylinder, and, particularly advantageously, there may be used for constructing the element a straw structure of the food consumption type employed for drinking beverages and made from a tube of plastics material of very small thickness provided with deformable bellows at suitable locations for constructing the spectacle frame.

Thus, the frame may comprise, in addition to the two bellows connecting each branch to the front part of the frame, a bellows in the middle of the front part and/or a bellows on each branch adjacent to the end of the branches for adaptation of the curvature of the branchs behind the ear.

Of course, additional bellows are also possible.

The set of lenses, which may be constituted either by two distinct lenses or preferably a single unit, may be fixed to the frame by various means and preferably by clipping. For this purpose, there may be provided, for example, in the front part of the spectacles, one or more longitudinal slots in which beading disposed on the upper part of the set of lenses is introduced and then clipped in position. As a variant, a connection may be achieved by adhesion or ultrasonic welding or any other means.

The invention therefore permits the realization of amusing spectacles having a novel appearance and great qualities of lightness and adaptability to the morphology of the user. Furthermore, the spectacles may have their frames initially in a completely rectilinear state, which facilitates the stacking of the spectacles and their transport and distribution.

Further advantages and features of the invention will be apparent from the following description given by way of a non-limitative example with reference to the accompanying drawing, in which:

FIG. 1 is a bottom plan view of the initially rectilinear frame,

FIG. 2 is an elevational view of the spectacles with this frame,

FIG. 3 is a perspective view of the spectacles adapted to the morphology of a person, FIG. 4 is a side elevational view corresponding to FIG. 3.

With reference to the drawing, it can be seen that the frame is constituted by a tubular element 1 constructed in the manner of a straw of the feed-consuming type, i.e. a tube of small thickness composed of a plastics material having spaced-apart deformable bellows. More precisely, the structure comprises, symmetrically relative to the center thereof, two bellows 2 forming the connection between the front part 3 of the frame and the branches 4, and a central bellows 5 located in the middle of the front part 3 and permitting the forming of any desired angle between the two parts of the front zone 3 defined in this way. Adjacent to the end, the branchs 4 each have a bellows 6 defining a branch end 7 adapted to be bent behind the ear, the branch 7 being extended by a further terminal bellows 8 whereby it is possible to perfect the hooking of the spectacles onto the ear. The front part 3 has, on substantially the whole of its length, a longitudinal slot 9 which terminates short of the bellows 2 but passes completely through the bellows 5. The set of lenses is constructed, in FIGS. 2 and 3, in a single piece composed of a transparent plastics material 10 with a nose notch 11 defining the two lenses 12, the shape of the set of lenses being infinitely variable. The upper edge of the set of lenses 10, which preferably includes a slightly thicker rib, is a force fit in the slot 9 so that the lenses are held fast to the frame. Optionally, an adhesive may be provided in this region for perfecting the connection.

FIGS. 3 and 4 show the shape assumed by the spectacles according to the invention and the function of the bellows.

Although the invention has been described in respect of a particular embodiment, it will be clear that the scope of the invention is in no way limited thereto and that various modifications of form or material may be made without departing from its spirit and scope.

I claim:

1. Spectacles comprising a frame, a set of lenses separate from and connected to the frame, said frame made from an elongated continuous cylindrical element which forms the front frame part to which the set of lenses are connected as well as the side branches which are to be positioned to the sides of the wearer's head, said continuous cylindrical element being capable of being initially rectilinear and bent, at least at certain locations, into a desired shape by the wearer, said certain locations being located at least at the junctions of said side branches with the front part and said certain locations comprising a semi-rigid deformable bellows, such that the frame can be bent at said bellows, by the wearer, into a shape which, because of the semi-rigid deformable characteristic, retains its bent shape while being capable of being subsequently deformed.

2. Spectacles according to claim 1, characterized in that the cylindrical element is a cylinder which has a circular section.

3. Spectacles according to claim 2, characterized in that the cylindrical element is a straw of the food-consuming type.

4. Spectacles according to claim 1, characterized in that the cylindrical element further comprises a bellows (5) in the middle of the front part (3) thereof.

5. Spectacles according to claim 1, characterized in that the cylindrical element further comprises a bellows (6) on each branch (4) for the curvature of the branches behind the ear.

6. Spectacles according to claim 5, characterized in that the cylindrical element comprises, at the end of each branch (4), a second bellows (8) below the curvature of the branches behind the ear.

7. Spectacles according to claim 1, characterized in that the set of lenses (10) is attached to the cylindrical element by an enlarged rib portion on the set of lenses engaging within a slot in the front part of the cylindrical element.

8. Spectacles according to claim 1, wherein the cylindrical element is initially rectilinear.

* * * * *